United States Patent [19]

Pollack

[11] 4,065,335

[45] Dec. 27, 1977

[54] PROCESS FOR MANUFACTURING A XEROGRAPHIC TONER CARTRIDGE

[75] Inventor: Maxwell Aaron Pollack, Morris Plains, N.J.

[73] Assignee: Van Dyk Research Corporation, Whippany, N.J.

[21] Appl. No.: 722,776

[22] Filed: Sept. 13, 1976

Related U.S. Application Data

[60] Continuation of Ser. No. 599,676, July 28, 1975, abandoned, which is a division of Ser. No. 489,694, July 18, 1974, Pat. No. 3,999,654, which is a continuation of Ser. No. 314,542, Dec. 13, 1972, abandoned.

[51] Int. Cl.² .......................... B29C 27/10; C09J 5/00
[52] U.S. Cl. ..................................... 156/69; 156/221; 156/227; 156/309
[58] Field of Search ................. 222/DIG. 1, 160, 540, 222/541, 542, 544; 206/216, 498, 527; 229/48 T; 156/69, 216, 226, 227, 247, 296, 221, 309; 428/296

[56] References Cited

U.S. PATENT DOCUMENTS

| | | | |
|---|---|---|---|
| 2,645,591 | 7/1953 | Makrauer | 229/48 T |
| 3,192,091 | 6/1965 | Hey et al. | 156/69 |
| 3,501,065 | 3/1970 | Altmann et al. | 222/DIG. 1 |
| 3,618,826 | 11/1971 | Kangas et al. | 206/84 |
| 3,639,195 | 2/1972 | Sanders | 428/296 |
| 3,671,356 | 6/1972 | Keinanen | 156/309 |

Primary Examiner—Charles E. Van Horn
Assistant Examiner—Basil J. Lewris
Attorney, Agent, or Firm—Arthur L. Lessler

[57] ABSTRACT

A process for manufacturing a xerographic toner cartridge containing a heat-fusible toner powder situated in a container having an open end surrounded by a peripheral lip. An elongated tongue of a material having non-directional shear strength characteristics is placed on top of the opening, with a thermoplastic adhesive layer being disposed between the container lip and the tongue. The adhesive is activatable by heat and pressure, and once activated adheres more strongly to the peripheral container lip than to the tongue. The adhesive is bonded to the tongue and the peripheral lip by a heated platen having a shape conforming to that of the lip. The heat and pressure applied is sufficient to form the desired adhesive bonds, but the temperature and time employed are insufficient to cause deterioration of the toner powder in the container. The tongue is more than twice as long as the peripheral lip, and the free end of the tongue is folded back against the bonded portion thereof to act as a tab, the free end of said tab being detachably secured to an adjacent wall of the container.

4 Claims, 4 Drawing Figures

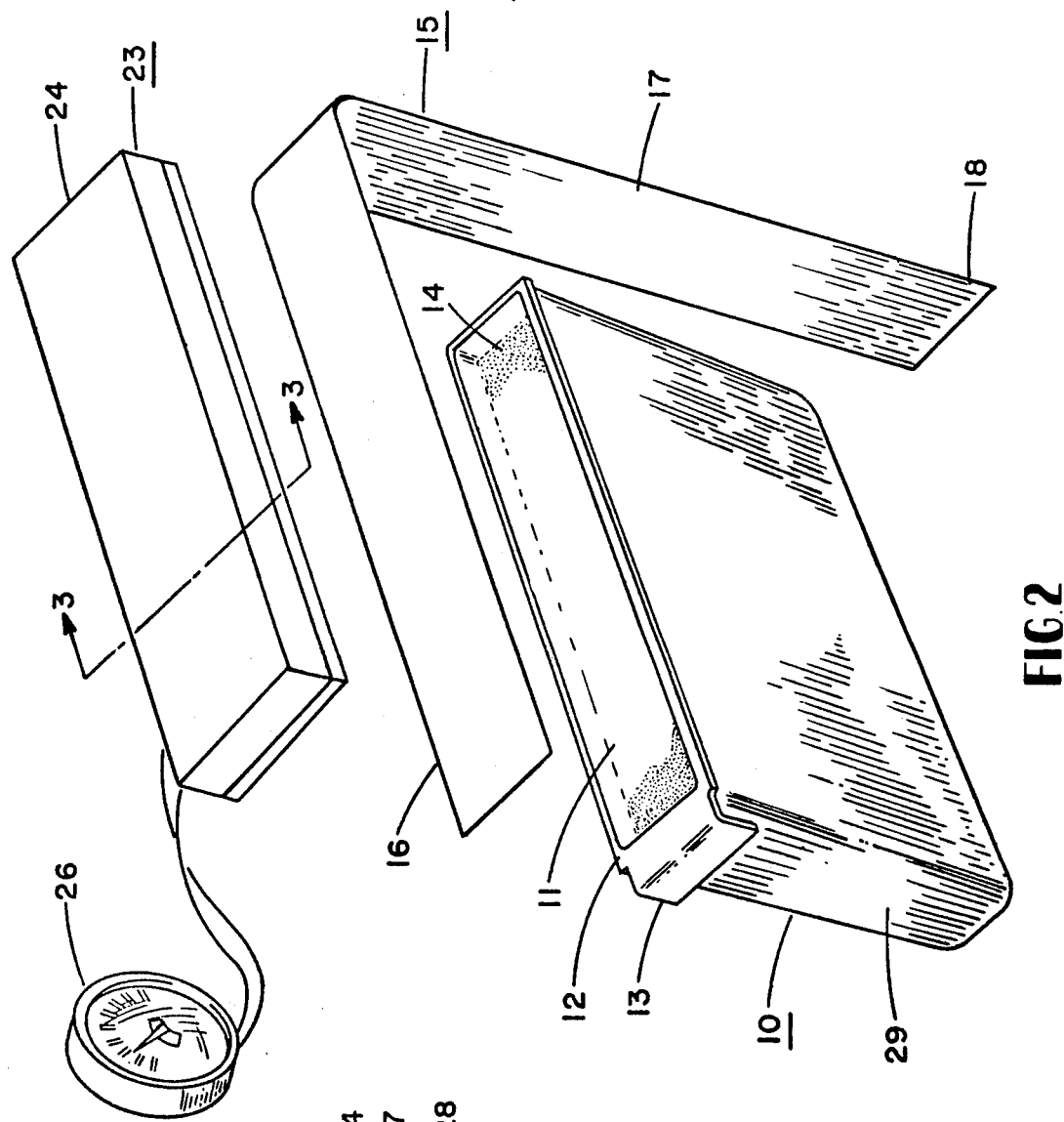
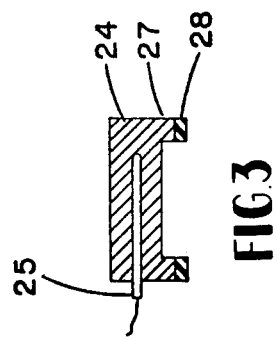

PROCESS FOR MANUFACTURING A XEROGRAPHIC TONER CARTRIDGE

This is a continuation of application Ser. No. 599,676, filed July 28, 1975, now abandoned; which application was a division of application Ser. No. 489,694, filed July 18, 1974, now Pat. No. 3,999,654; which last-mentioned application was a continuation of application Ser. No. 314,542, filed Dec. 13, 1972, now abandoned.

BACKGROUND OF THE INVENTION

This invention relates to a xerographic toner cartridge, and process for manufacturing the same.

In the practice of xerography, an electrostatic image of a desired pattern is formed on an insulating surface. This is usually accomplished by providing a photoconductive insulating material affixed to a conductive backing, uniformly electrostatically charging the photoconductive surface (typically by a corona charging technique), and subsequently exposing the charged photoconductive surface to an electromagnetic radiation pattern (usually a visible light pattern) of the image to be reproduced. The electromagnetic radiation pattern discharges the photoconductive surface in the areas where the surface is irradiated, thus forming an electrostatic charge pattern on the photoconductive surface corresponding to the pattern of the desired image.

In order to render the image defined by the electrostatic charge pattern visible and permanent, the photoconductive surface is contacted with microscopic particles which may be in the form of a fine powder, the particles having been provided by some means with an electrostatic charge opposite in sign to the charge remaining on those portions of the photoconductor which have not been discharged (or which have only been partially discharged) by the incident electromagnetic radiation. As a result, these microscopic particles, commonly known as "toner", adhere to the photoconductor only in those areas which retain an electrostatic charge, i.e. those areas which have not been irradiated.

The pattern of toner particles, which corresponds to the pattern of the desired image, is subsequently either (i) fused to the photoconductive surface by application of heat or a suitable solvent to form a permanent image, or (ii) transferred to another surface, which may comprise ordinary paper, and subsequently fused thereto by suitable application of heat or solvent.

The toner powder is normally contained within a toner dispenser situated adjacent a developer tank which contains a mechanism for delivering the toner particles to the photoconductor surface. The toner powder is discharged from the toner dispenser to the sump of the developer tank as copies are produced, resulting in gradual depletion of toner powder from the dispenser. As a result, it is necessary to periodically add toner powder to the toner dispenser to replenish the supply thereof.

This periodic addition of toner powder to the toner dispenser of the copier is normally performed by a machine operator dressed in street clothing. In many cases, the operator pours toner powder from a small plastic bottld into the dispenser. Since the toner powder is extremely fine and is pigmented with coloring matter such as carbon black, the toner powder tends to form a toner "cloud" while being poured and may cause the operator's hands and clothing to become dirty.

In an effort to enable the operator to replenish the toner supply without soiling of hands and clothing, and to provide a reservoir for additional toner (thus effectively increasing the toner storage capacity of the copying machine), a number of arrangements have been devised which employ toner cartridges that can be placed in the copier and opened after they are in position. Such cartridges commonly employ a slidable cardboard seal situated adjacent the open end of the cartridge. The cartridge is inserted into the copier in an inverted position atop the toner dispenser, i.e. with the seal-covered open end downward, and the seal is slid from the cartridge and the adjacent portion of the toner dispenser to permit the toner powder within the cartridge to fall into the dispenser.

Such friction sealed cartridges, however, do not provide a sufficiently tight seal to fully accomplish the desired objectives. As a result, some of the fine toner powder within the cartridge escapes when the cartridge is subjected to shock and vibration in shipment or handling, so that when the carton containing the cartridge is opened, the interior of the carton and part or all of the outer surface of the cartridge is covered with black toner powder; thus the cartridge and packing cannot be handled without soiling the operator's hands and clothing. In addition, a small quantity of toner may escape from the cartridge when the same is inverted and subjected to some pressure while being inserted into the copier; this escaping toner is likely to cause additional soiling.

Attempts to provide a tighter seal by, e.g., bonding paper to the cartridge opening with a weak cement, have resulted in additional problems, in that in many cases the paper seal tears while being removed from the cartridge while the cartridge is in the copier. As a result, it becomes impossible to remove the partially opened inverted cartridge from the copier without causing extensive spillage of toner within the machine and heavy soiling of the operator's hands and clothing.

Accordingly, an object of the present invention is to provide a reliable sealed toner cartridge which substantially eliminates any possibility of toner leakage during shipping and handling of the cartridge, and which has a sealing member which can be rapidly, reliably and easily removed when desired.

As herein described, there is provided a xerographic toner cartridge comprising a toner container having an elongated surface opening and a peripheral lip surrounding the opening. The opening is covered by an elongated flexible smooth-surfaced tongue having a length greater than twice the length of the opening. The tongue has longitudinal spaced sealing and tab portions, the length of the sealing portion being less than the length of the tab portion. The tonque is secured to the peripheral lip of the cartridge by an adhesive bond having a peel strength substantially less than the shear strength of the tongue. The tongue has a fold between its sealing and tab portions.

Also described herein is a process for manufacturing a xerographic toner cartridge, comprising the steps of providing a toner container having an elongated surface opening therein with a peripheral lip surrounding said opening, positioning an elongated flexible tongue adjacent said lip so that said tongue covers said opening, the length of said tongue being greater than twice the length of said opening, disposing a heat-activatable adhesive layer between said tongue and said lip, contacting said tongue with a heated platen to press said tongue against said lip for a time sufficiently long to activate said adhesive while at the same time providing insufficient heat transfer to deteriorate any toner situated within said container, and folding the free portion of said tongue to dispose said free portion adjacent the bonded portion thereof to form a tab, the free end of said tongue protruding beyond said lip.

In the drawing:

FIG. 2 illustrates a preferred arrangement for sealing the toner cartridge of FIG. 1;

FIG. 3 shows a cross-sectional view of the heated platen employed in the sealing arrangement illustrated in FIG. 2.

Figure 1:
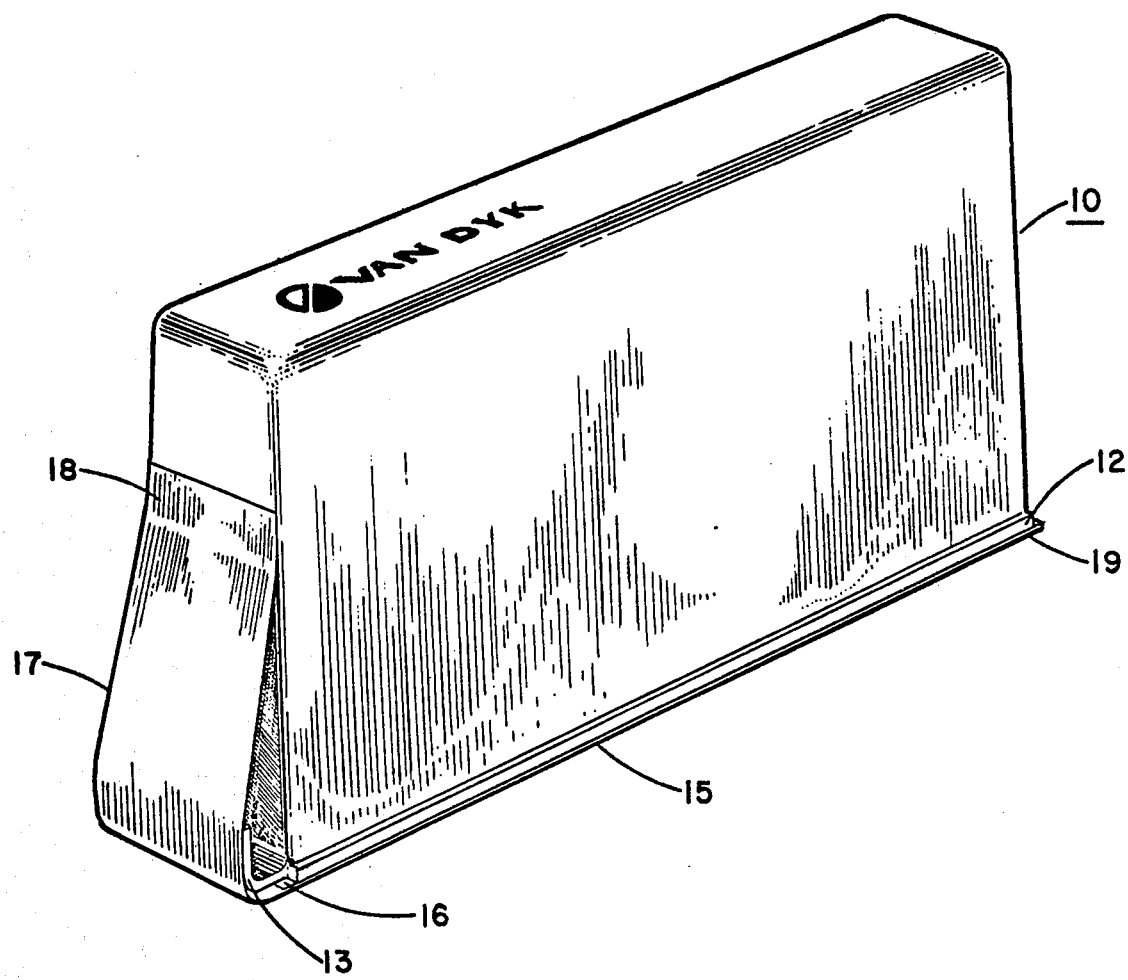
FIG. 1 shows a xerographic toner cartridge according to an embodiment of the present invention.

As shown in FIG. 1, a xerographic toner cartridge 10 has a generally rectangular prismate form, with an elongated surface opening 11 (not visible in FIG. 1) therein. The elongated surface opening 11 is surrounded by a peripheral lip 12. A handle 13 allows the cartridge to be readily inserted into and removed from a xerographic copying machine. If desired, the toner cartridge may have a form other than prismatic, e.g., cylindrical, conical or pyramidal.

The toner cartridge 10 may be constructed of any suitable material which is non-reactive with the toner powder contained therein, and may be molded in a single piece from a suitable plastic material.

Preferably, the cartridge 10 and its peripheral lip 12 may be constructed of one or more of the following plastics: (i) a styrene, vinyl or acrylic polymer, (ii) acrylonitrile-butadiene-styrene terpolymer, (iii) phenolic, urea-formaldehyde or melamine-formaldehyde resin, (iv) cellulose acetate, (v) cellulose propionate, (vi) cellulose butyrate, (vii) polyethylene, (viii) polypropylene, (ix) polyester or (x) polycarbonate.

The cartridge 10 is filled with a quantity of finely divided toner particles 14 (see FIG. 2) for use in the particular copier for which the cartridge is designed. In order to seal the elongated surface opening 11 adjacent the peripheral lip 12, an elongated flexible smooth-surfaced tongue 15 covers the opening 11. The tongue 15 has a sealing portion 16 which covers the opening 11 and is bonded to the peripheral lip 12, and a tab portion 17 which is folded back over the sealing portion 16, the tab portion 17 extending over the handle 13 and being detachably secured to the toner cartridge 10 at the end 18 of said tab portion. The length of the tab portion 17 is greater than the length of the sealing portion 16 of the tongue 15. the tongue 15 being divided by a fold 19 which separates the sealing and tab portions thereof. As a result, the overall length of the tongue 15 is greater than twice the length of the peripheral opening 11 of the toner cartridge 10.

As shown in FIG. 1, the part of the tab portion 17 which is adjacent the fold 19 is disposed in juxtaposition with the sealing portion 16 of the tongue 15, thus permitting the cartridge 10 and its associated tongue 15 to be slidably inserted into a copying machine so that the tongue 15 is positioned in contact with the lip of a toner dispenser within the machine.

Figure 4:
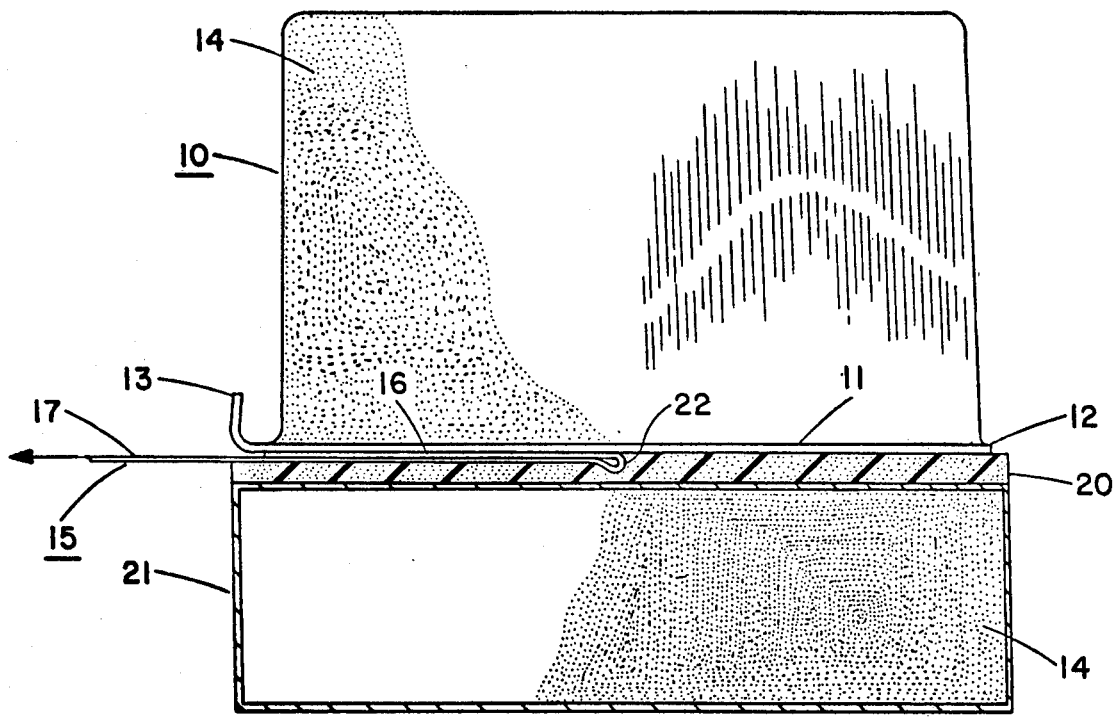
FIG. 4 shows a partial cross-sectional view of the toner cartridge in position adjacent the toner dispenser of a xerographic copier, with the cartridge seal partially removed.

The manner in which the toner cartridge 10 is positioned adjacent the toner dispenser of a xerographic copier is more clearly illustrated in FIG. 4, wherein the toner cartridge 10 is shown positioned with the peripheral lip 12 thereof in contact with the peripheral lip 29 of a toner dispenser or receptacle 21 having an elongated opening adjacent the opening 11 of the cartridge 10.

The elongated opening of the toner dispenser 21 has dimensions approximately equal to those of the opening 11 of the cartridge 10, and the peripheral lip 20 surrounding the opening of the toner dispenser 21 preferably comprises a resilient material such as wool felt or sponge rubber. Alternatively, the peripheral lip 29 may comprise a smooth-surfaced material such as polytetrafluoroethylene or metal. A suitable clamping means (not shown in FIG. 4) may be provided to press the peripheral lip 12 of the toner cartridge 10 against the peripheral lip 20 of the toner dispenser 21, in order to preclude any leakage of toner powder while the cartridge is positioned within the copier.

After the toner cartridge 10 has been positioned and, if desired, clamped adjacent the toner dispenser 21, the end portion 18 of the tongue 15 is detached from the cartridge 10, and pulled away from the cartridge by the operator to gradually peel the sealing portion 16 of the tongue 15 from the peripheral lip 12, thus permitting the toner powder within the cartridge 10 to fall into the toner dispenser 21. FIG. 4 shows the toner cartridge 10 mounted in position, with approximately half of the sealing portion 16 of the tongue 15 having been peeled away from the peripheral lip 12 of the cartridge.

In order to facilitate smooth trouble-free withdrawal of the tongue 15 when the cartridge 10 is in position, it is desirable that the surfaces of the tongue 15 be sufficiently smooth so that sliding friction between the sealing portion 16 and the adjacent moving portion of the tongue 15, as well as between the tongue 15 and the adjacent portion of the peripheral lip 20, is minimized.

In addition, the tearing or shear strength of the tongue 15 in any direction should be substantially greater than the peel strength of the adhesive bond between the sealing portion 16 of the tongue 15 and the adjacent peripheral lip 12 of the toner cartridge 10. A further highly desirable characteristic is that folding of the tongue 15, either at the initial fold 19 shown in FIG. 1 or at the "moving fold" 22, does not result in materially decreasing the shear strength of the material comprising the tongue 15 at either of said folds. Preferably, the shear strength of the tongue 15 along either of said folds should be at least 85 percent of the shear strength of portions of the tongue 15 remote from said folds.

These flexibility, shear strength and fold strength characteristics make ordinary web materials such as paper products generally unsuitable for use as the tongue material. When paper is folded its fibers are crushed in such a manner as to greatly reduce the shear or tear strength of the paper along the fold. In addition, paper generally does not have the non-directional shear strength characteristics that are desirable for the material of the tongue 15.

I have found that excellent results are achieved when the tongue 15 is constructed of a material comprising a sheet structure comprising a multiplicity of randomly oriented and bonded fibers. A preferred material of this type is sold by E. I. duPont de Nemours & Company, Inc., Wilmington, Del., United States of America, under the trade name Tyvek. This material comprises a polyethylene fibrous sheet formed of randomly oriented bonded polyethylene fibers, possesses non-directional shear strength or tearing characteristics, has a melting point sufficiently high to withstand the temperatures employed in forming the adhesive bond between the tongue 15 and the peripheral lip 12 of the cartridge 10, and retains at least 85 percent of its shear strength when folded.

Instead of polyethylene, other suitable fibrous plastics such as polypropylene, polyvinyl chloride, polyvinylidene chloride, cellulose acetate, nylon, polyethylene terephthalate or combinations thereof may be employed to form the fibrous sheet structure which comprises the tongue 15.

By the term "non-directional shear strength characteristics" is meant that the structure of the material is such that, when torn, substantially the same amount of force is continually required to extend the tear as is required to initially tear the material.

In order to secure the sealing portion 16 of the tongue 15 to the peripheral lip 12 of the toner cartridge 10, a thermoplastic material is preferably employed, the thermoplastic material being heated to soften the same while the sealing portion 16 is pressed against the peripheral lip 12. Upon cooling, the desired adhesive bond is formed.

Suitable thermoplastic adhesive bonding materials are: polyvinyl acetate, cellulose acetate, an alkyd, nitrocellulose, an epoxy resin, polyethylene, an isocyanate, a polyester-isocyanate, natural rubber, synthetic rubber, polyvinyl butyral, acrylic polymer, methacrylic polymer, or cyanoacrylic monomer.

Alternatively, the desired adhesive bond can be formed by disposing bonding material in an aqueous emulsion or dispersion, and permitting the same to dry while the sealing portion 16 of the tongue 15 is maintained in contact with the peripheral lip 12 of the toner cartridge 10. Another bonding technique that may be employed involves softening of the surface of the peripheral lip 12 with a suitable organic solvent, and allowing the peripheral lip 12 to reharden in contact with the sealing portion 16 of the tongue 15 as the organic solvent evaporates. Where the peripheral lip 12 comprises one or more of the materials referred to on page 6 at lines 11 to 15, the organic solvent may comprise acetone, ethylene dichloride, fluorocarbons or toluene.

The adhesive bonding material may, in any of the aforementioned cases, be applied either to the sealing portion 16 of the tongue 15 or to the surface of the peripheral lip 12 of the toner cartridge 10.

Preferably, the adhesive material comprising the bond between the sealing portion 16 of the tongue 15 and the peripheral lip 12 of the toner cartridge 10 should be a heat-activatable material, with the resulting bond being such that the adhesive is more strongly adherent to the peripheral lip 12 than to the sealing portion 16 of the tongue 15. This will result in the adhesive material remaining on the peripheral lip 12 when the sealing portion 16 of the tongue 15 is peeled away therefrom, thus minimizing sliding friction between the tongue 15 and the peripheral lip 20 of the adjacent toner dispenser 21.

The manner in which the tongue 15 may be sealed to the cartridge 10 will be more clearly understood by reference to FIGS. 2 and 3 of the drawing.

As shown in FIG. 2, the toner cartridge 10 to be sealed is positioned with the elongated surface opening 11 therein facing upward, and the cartridge is loaded with toner powder 14 through the opening 11. In order to minimize the possibility of deterioration of the toner powder 15 by heat transfer during the sealing process, the level of toner powder is situated approximately one-half inch below the peripheral lip 12. A tongue 15 comprising a polyethylene fibrous sheet material comprising randomly oriented and bonded polypropylene fibers, such as Tyvek, is positioned adjacent the peripheral lip 12 of the cartridge 10, with the sealing portion 16 of the tongue 15 in contact with said peripheral lip. The surface of the sealing portion 16 which is to be brought in contact with the peripheral lip 12, is coated with the desired thermoplastic adhesive material. A suitable and preferred heat-activatable thermoplastic adhesive material for this purpose is polyvinyl acetate. This adhesive will form the desired bond between the sealing portion 16 of the tongue 15 and the peripheral lip 12 of the toner cartridge 10, when heated for five to ten seconds at a temperature on the order of 275° F.

Preferably, the thickness of the tongue 15 may be on the order of 1.0 to 10 mils, and the thickness of the adhesive layer may be on the order of 0.05 to 2.0 mils.

After the sealing portion 16 of the tongue 15 has been positioned in contact with the peripheral lip 12 of the toner cartridge 10, the part of the sealing portion 10 in contact with the peripheral lip 12 is heated by means of the heating platen 23, which is maintained at a temperature on the order of 275° F.

The heating platen 23 comprises an aluminum bar 24 (see FIG. 3) having a plurality of resistive heating elements 25 embedded therein. The temperature of the heating platen 23 is monitored by a thermocouple (not shown) in contact therewith and a meter 26 connected to the thermocouple.

The aluminum block 24 is machined to form a circumferential ridge 27 dimensioned to conform to the size and shape of the peripheral lip 12 of the toner cartridge 10. In order to insure good thermal contact between the heating platen 23 and the adjacent parts of the sealing portion 16 and the peripheral lip 12, the circumferential ridge 27 of the aluminum block 24 of the heating platen 23 is covered with a layer 28 of a suitable resilient material such as neoprene.

To perfrom the sealing operation, the toner cartridge 10 is mounted in a suitable jig (not shown), the sealing portion 16 of the tongue 15 is positioned atop the cartridge to close the opening 11 thereof, with the adhesive coating on the sealing portion 16 being in contact with the peripheral lip 12 of the toner cartridge 10, and, also by means of a suitable jig arrangement (not shown), the heating platen 23 (maintained at a temperature on the order of 275° F) is moved downward so that the heated neoprene layer 28 thereof contacts the sealing portion 16 of the tongue 15 and heats the peripheral lip 12 of the toner cartridge 10 and the adjacent portion of the adhesive layer disposed on the sealing portion 16, for a time on the order of 5 to 10 seconds. This heating process softens the thermoplastic adhesive bonding material, so that upon rehardening, the adhesive material forms a secure adhesive bond between the peripheral lip 12 and the adjacent part of the sealing portion of the tongue 15.

The time required for heating the adhesive bonding material to activate the same is sufficiently short so that there is insufficient heat transfer to the cartridge 10 to deteriorate the toner situated therein.

Thereafter, the heating platen 23 is raised, and the tab portion 17 of the tongue 15 is folded over against the sealing portion 16 thereof, with the end 18 of the tab portion 17 being detachably secured to the side wall 29 of the cartridge 19 by a relatively weak adhesive such as rubber cement. Thereupon the completed cartridge has the general appearance shown in FIG. 1, and is ready for use.

I claim:

1. A process for manufacturing a xerographic toner cartridge, comprising the steps of:

providing a toner container having a bottom, two side walls, two end walls and an elongated surface opening therein opposite said bottom, with a peripheral lip surrounding said opening;

filling said container with a heat-fusible xerographic toner powder;

positioning an elongated smooth-surfaced flexible tongue comprising a tear-resistant material having non-directional shear strength characteristics adjacent said lip so that said tongue covers said opening, said material comprising a sheet structure including a multiplicity of randomly oriented and bonded fibers, the length of said tongue being greater than twice the length of said opening, said tongue having a sealing portion covering said opening and an adjacent tab portion having a length greater than that of said sealing portion, said tongue having a thickness on the order of 1 to 10 mils;

disposing a heat-activatable thermoplastic adhesive layer between said peripheral lip and the sealing portion of said tongue, said adhesive when activated being more strongly adherent to said peripheral lip than to the sealing portion of said tongue, so that both surfaces of any part of said sealing portion later peeled from said lip will be free of said adhesive, said layer having a thickness on the order of 0.05 to 2 mils;

providing a platen having a circumferential ridge dimensioned to conform to the size and shape of the peripheral lip of said toner container;

heating said platen to, and maintaining said platen at a predetermined operating temperature;

contacting said tongue with the circumferential ridge of said heated platen to press said tongue against said lip for a time sufficiently long to soften said thermoplastic adhesive so that upon rehardening the thermoplastic adhesive forms a secure adhesive bond between said lip and the adjacent part of the sealing portion of said tongue to prevent the escape of toner powder from said container, the temperature and time associated with said contacting step providing insufficient heat transfer to cause fusing deterioration of the toner powder within said container; and folding said tongue at the junction of the sealing and tab portions thereof to dispose said tab portion adjacent said sealing portion with the free end of said tab portion protruding beyond said lip adjacent one of said container walls, the shear strength of said tongue along said fold being at least 85 percent of the shear strength of portions of said tongue remote from said fold, said tongue comprising a material having a shear strength in any direction substantially greater than the peel strength of said activated adhesive bond between said sealing portion of said tongue and said peripheral lip.

2. The process according to claim 1, wherein said tongue includes fibers selected from the group consisting of polyethylene, polypropylene, polyvinyl chloride, polyvinylidene chloride, cellulose acetate, nylon, and polyethylene terephthalate.

3. The process according to claim 1, wherein the portion of said platen contacting said tongue comprises a resilient material.

4. The process according to claim 1, comprising the additional step of detachably securing the free end of said tab portion of said tongue to said adjacent container wall.

* * * * *